July 2, 1968     S. S. STATA     3,390,912
FLOOR MAT AND LOCATING FRAME COMBINATION FOR MOTOR VEHICLES
Filed May 6, 1966     3 Sheets-Sheet 1
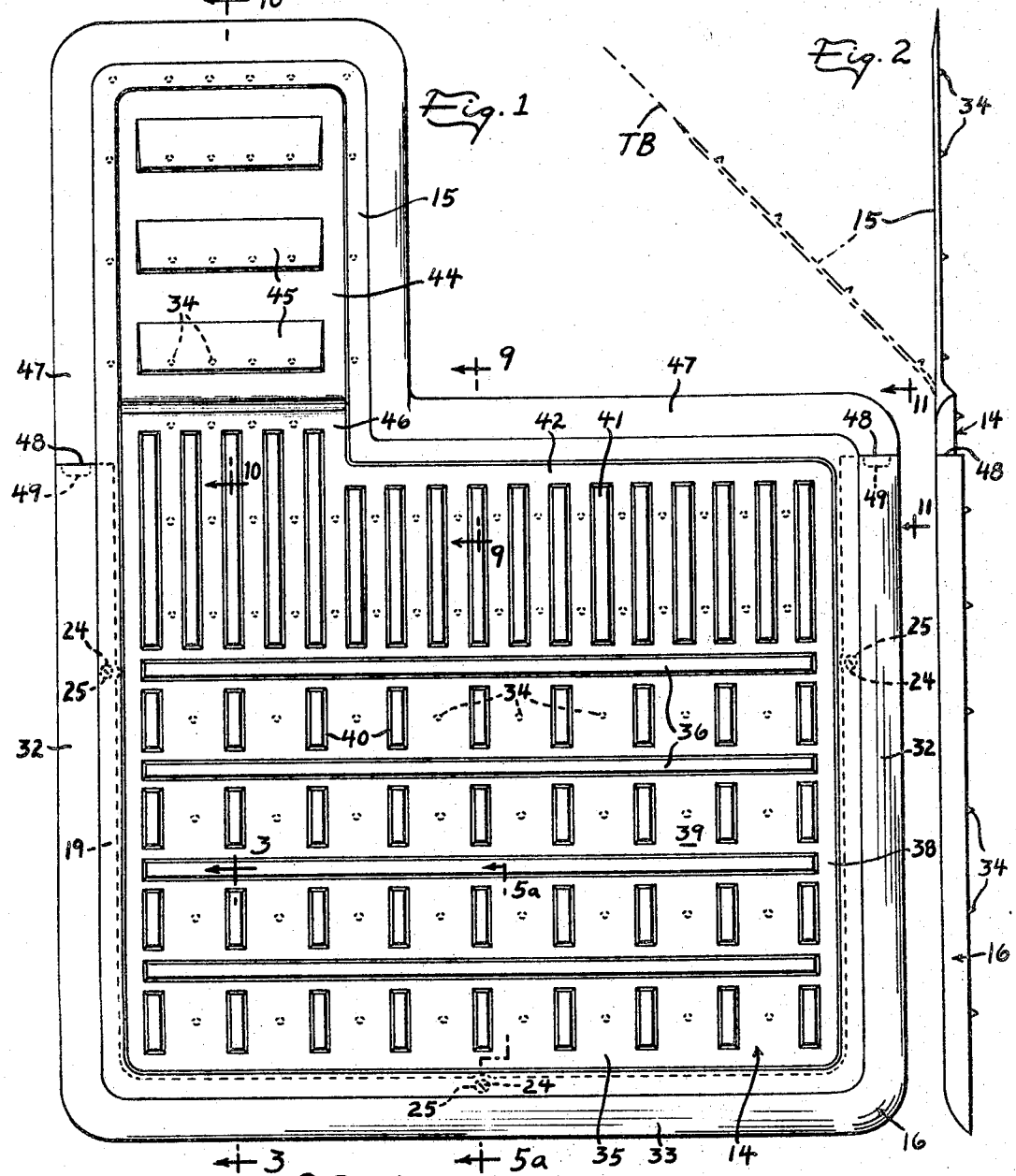
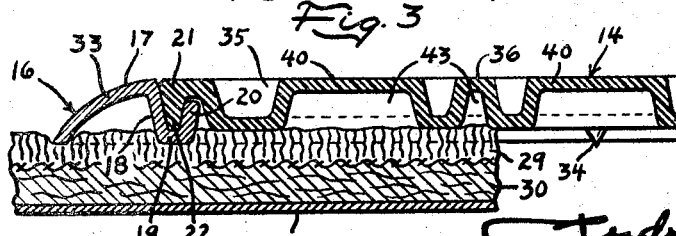
Inventor
Stanley S. Stata
Attorney July 2, 1968     S. S. STATA     3,390,912
FLOOR MAT AND LOCATING FRAME COMBINATION FOR MOTOR VEHICLES
Filed May 6, 1966     3 Sheets-Sheet 2
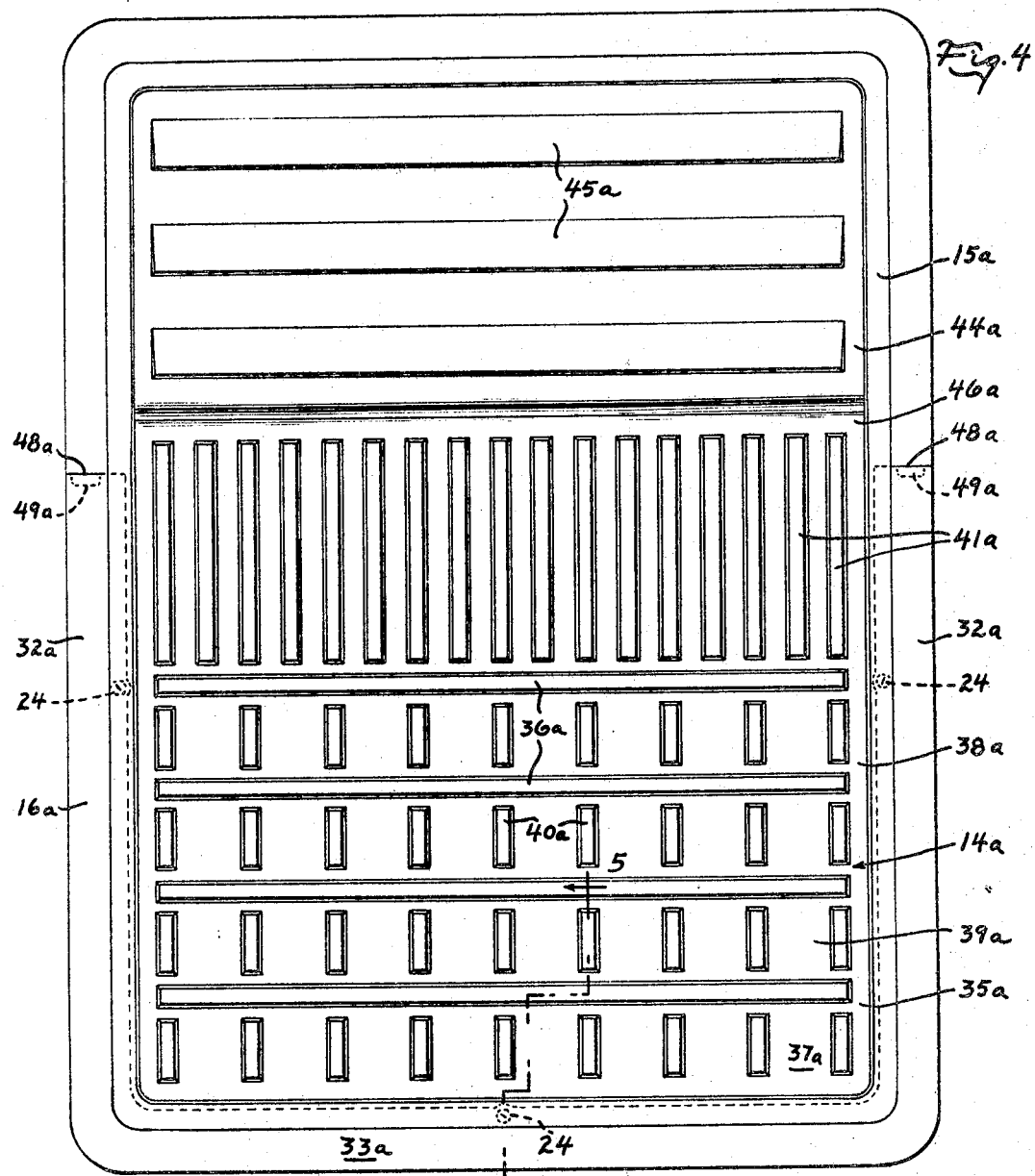
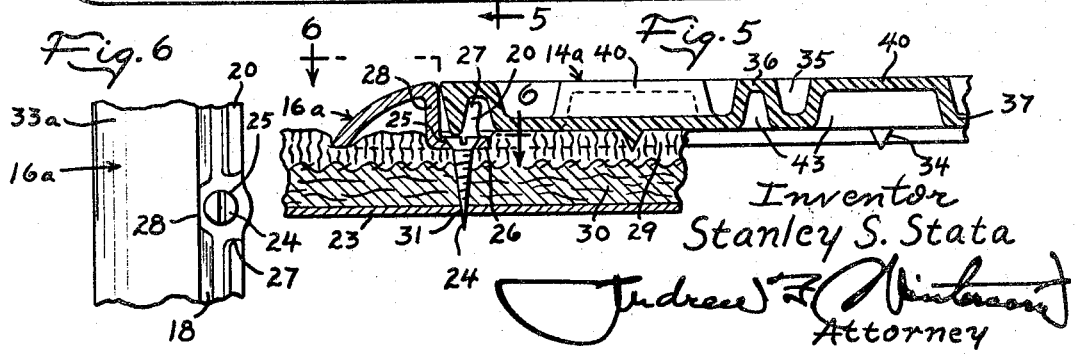
Inventor
Stanley S. Stata
Attorney

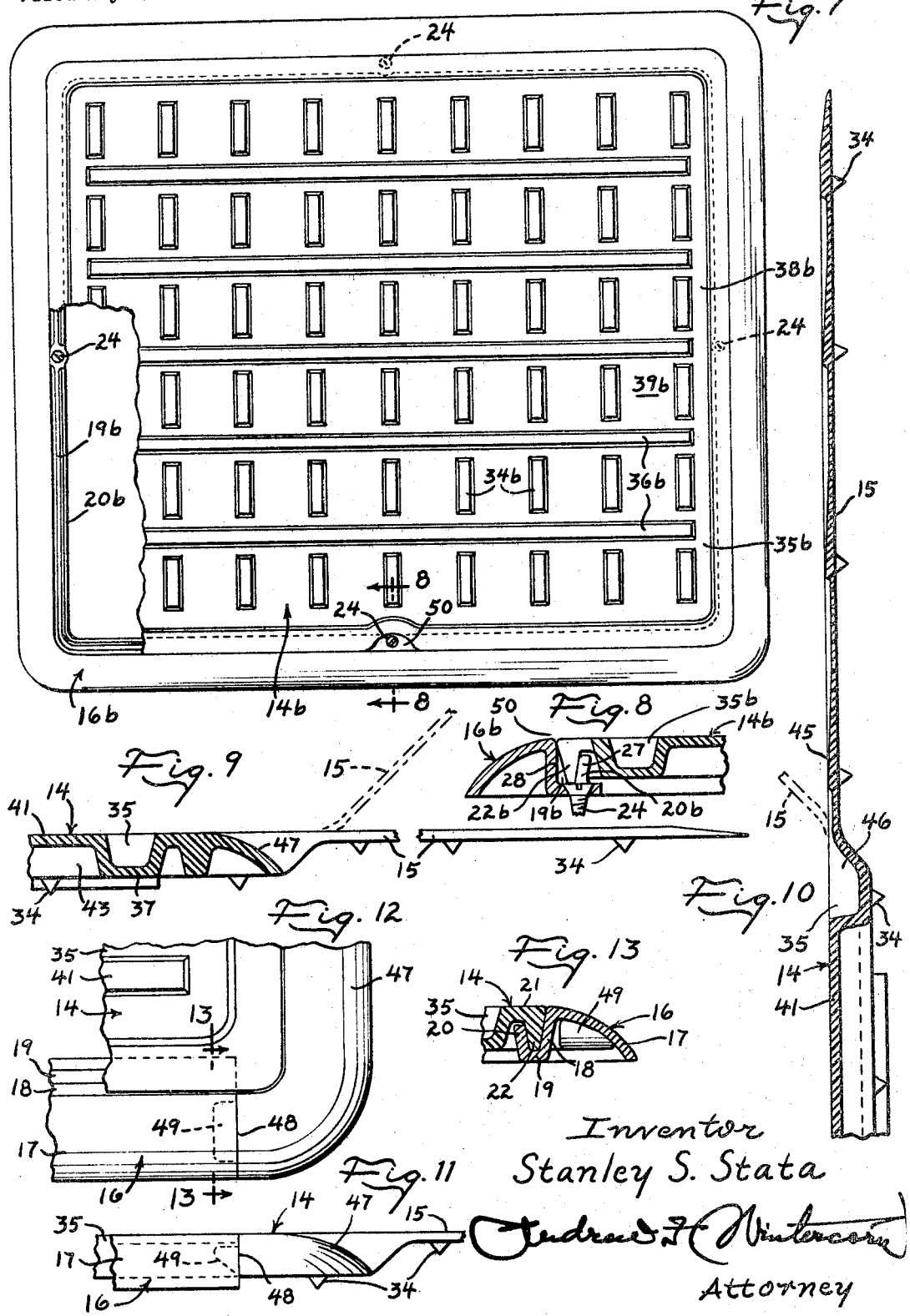

United States Patent Office

3,390,912
Patented July 2, 1968

3,390,912
FLOOR MAT AND LOCATING FRAME COMBINATION FOR MOTOR VEHICLES
Stanley S. Stata, 301 Longwood,
Rockford, Ill. 61107
Filed May 6, 1966, Ser. No. 548,101
10 Claims. (Cl. 296—1)

This invention relates to a novel floor mat and locating frame combination for application over the carpet on the floors of motor vehicles.

The principal object of my invention is to provide a floor mat of sufficient depth between the shoe scraping ribs thereof to collect moisture and dirt in the anticipated amount, the moisture being retained in the recesses between the ribs during evaporation while leaving the top surfaces of the ribs fairly dry, and the mat being designed to rest on top of the carpet on the floor of the motor vehicle and be detachably secured in place by means of a relatively rigid generally rectangular frame rigidly secured to the floor, the marginal portions of the mat having downwardly projecting tapered rim portions wedgingly engageable on the correspondingly inclined inner side walls of an annular recess provided therefor in the frame so that the mat is securely though detachably retained in place in the frame with the top surface thereof flush with the top of the frame for a neat and attractive appearance. In the case of the floor mats at the driver's position and the front passenger's position, the mat includes a thinner forwardly extending ribbed foot scraping toe-board portion on the front end thereof flush with the top of the main body portion of the pan, which is adapted to be flexed upwardly and rest on the carpet of the toe-board so as to drain freely into the main body portion of the pan, the locating frame in both those cases being devoid of any front cross-portion, the mat having shoulders provided on its marginal portions at both sides for locating abutment with the front end of the side portions of the frame, and, in the case of the floor mat for the driver's position, where the toe-board extension on the mat extends upwardly only on the left-hand side of the steering column, the front edge portion of the main body portion of the pan to the right of the toe-board extension is curved downwardly to match the shape of the frame for good appearance and also to facilitate sweeping dirt off the toe-board carpet into the recess of the pan, the downward curvature on all sides of the frame providing similar convenience. In all four locations where these floor mats are used in a motor vehicle, the mats, although securely held in position once inserted in the frames, are easily removable and replaceable, enabling thoroughly washing and drying the same at intervals for neater appearance, vacuum cleaning of the mats between such thorough cleanings serving to keep the mats always neat and attractive in appearance.

The invention is illustrated in the accompanying drawings, in which:

FIG. 1 is a plan view of a floor mat and locating frame combination made in accordance with my invention, the mat shown being for the driver's position;

FIG. 2 is a side view of FIG. 1 showng how the toe-board extension is adapted to be flexed upwardly to overlie the carpet on the toe-board;

FIG. 3 is a sectional detail on the line 3—3 of FIG. 1 with the parts substantially full size and showing how the locating frame and mat overlie the carpet with the frame impressed more or less in the carpet while the mat rests on top of the carpet;

FIG. 4 is a floor mat and locating frame combination of my invention provided for the front passenger's position;

FIG. 5 is a sectional detail similar to FIG. 3 taken on broken line 5—5 of FIG. 4 and corresponding to a sectional detail on the broken line 5a—5a of FIG. 1;

FIG. 6 is a detail on the line 6—6 of FIG. 5;

FIG. 7 is a plan view of the floor mat and locating frame combination of my invention provided for each of the two rear-seat passengers' positions, a portion of the mat being broken away to better illustrate the frame;

FIG. 8 is a sectional detail on the line 8—8 of FIG. 7, made on the same scale as FIGS. 3 and 5;

FIGS. 9 and 10 are sectional details on the correspondingly numbered lines of FIG. 1, showing the parts on the same scale as in FIG. 3, both of these views indicating in dotted lines how the toe-board extension is adapted to be flexed upwardly to overlie the carpet on the toe-board;

FIG. 11 is a side view taken on the line 11—11 of FIG. 1;

FIG. 12 is a plan view of the same corner of the mat and frame combination shown in FIG. 11, and FIG. 13 is a sectional detail on the line 13—13 of FIG. 12.

Similar reference numerals are applied to corresponding parts throughout the views.

Referring first to FIGS. 1 to 3 and 8 to 13, the reference numeral 14 designates a floor mat made in accordance with my invention, designed for use at the driver's position, the same having only a narrow toe-board extension 15 on the left-hand side to rest on the toe-board carpet to the left of the steering column, and 16 designates the locating frame therefor. The floor mat is preferably molded of rubber or plastic material but the frame 16 is metallic preferably and generally U-shaped and has a downwardly and outwardly curved flange portion 17 integral with the top of the outer wall 18 of an open top channel 19 that extends all around the inside of the frame 16. The channel 19 has an inner wall 20 not as high as wall 18 over which the marginal rim portion 21 of the mat 14 extends horizontally so that the downwardly extending tapered flange 22 provided thereon can have wedging engagement on the inner side of the correspondingly inclined inner wall 20 of the channel 19 to secure the mat 14 in place and yet permit removal of the mat from the frame whenever it is to be thoroughly washed to clean off any unsightly smears of dirt that might otherwise mar the neat and attractive appearance of the ensemble. The frame 16 is adapted to be fastened to the sheet metal floor 23 of the motor vehicle by means of sheet metal screws 24 entered through holes 25 in horizontal ears 26 provided at points where the inner wall 20 of the channel 19 is omitted leaving a gap 27 as seen in FIG. 5, the inclined outer wall 18 being also altered at these points, as indicated by the vertical wall 28 in FIG. 5, to leave ample room for entering and fastening the screws. Each screw 24 passes through the carpet 29 and sound deadening jute 30 therebeneath to thread in a hole 31 pierced in the sheet metal floor 23. Three of these screws are indicated, one in each of the arms 32 of the generally U-shaped frame 16 near the front end, and one at the middle of the cross-portion 33. Of course, more screws may be used, if needed, but three are doubtlessly sufficient for rigid fastening of the frame. When the screws 24 are tightened, the frame 16 is impressed into the carpet 29, as clearly appears in FIGS. 3 and 5, but the mat 14 rests on top of the carpet and it has conical projections 34 which are molded integral with the bottom of the mat and its extension 15, these serving by impression in the carpet 29 when the mat is placed inside the frame 16 to hold the carpet in a set position and prevent its shifting about even under fairly heavy foot pressure, as when one is scraping dirt off the bottom of his shoes.

The mat 14 has a pan portion 35 that is fairly deep and has spaced parallel scraping ribs 36 formed integral with the bottom 37, these ribs extending substantially the full depth of the pan and ending short of the sides thereof to leave a deep annular recess 38 all around the pan communicating with the ends of recesses 39 provided between the ribs 36, whereby to provide enough space for the collection of the anticipated amount of moisture and dirt, the moisture being retained in the pan during evaporation while leaving the top surfaces of the ribs 36 fairly dry. Other short scraping ribs 40 are provided in right angle relationship to the ribs 36 and in evenly spaced parallel relation in the recesses 39, all of these being of the same height as ribs 36 and having their top surfaces therefore in coplanar relationship to the top surfaces of ribs 36 to serve also in scraping off dirt from the bottom of shoes. Longer ribs 41 are provided in the front recess 42 in closer spaced parallel relationship and at right angles to the front rib 36, those on the right hand end of this row serving as a heel rest behind the accelerator pedal when it is disposed in front of the pan. These ribs allow easy drainage of moisture from between them into the adjacent annular recess 38. To conserve in the cost of production and also to make the mats lighter weight, all of the ribs 36, 40, and 41 may be made hollow, as indicated at 43. In passing, it will be seen in FIGS. 3 and 5 that the top of the pan portion 35 lies substantially flush with the top of the frame 16, thus giving a nice trim appearance and at the same time allowing easy sweeping of dirt off the carpet 29 into the pan 35.

The toe-board extension 15, molded integral with the pan 35, is generally rectangular in form and fairly narrow, and extends from the left front corner of the pan and is adapted to rest on the carpet on the toe-board, represented by the dotted line at TB in FIG. 2. The toe-board extension 15, as clearly illustrated in FIGS. 2, 9, and 10, is thinner than the pan 35 and normally disposed in coplanar relationship to the top thereof but is arranged to be flexed upwardly at an angle of approximately 45° to rest on the carpet on the toe-board TB. The toe-board extension 15 has a shallow generally rectangular recess 44 provided therein from which project a plurality of foot scraping ribs 45 of small height in widely spaced parallel relation off which there is good drainage into the pan 35, as indicated at 46. Thus, there is no likelihood of any moisture scraped off the shoes on the mat getting onto the carpet 29, whether it be in using the ribs 45 of small height or the other ribs 36, 40, or 41. All of the moisture is retained in the pan 35 until evaporated, and, of course, all of the dirt also, but the top surfaces of the ribs 36, 40, 41, and 45, will always remain fairly dry.

The mat 14 has downwardly curved edge portion 47 on the three sides of the toe-board extension 15 and across the front of the pan portion 35, these edge portion matching the curvature of the marginal portion 17 of the frame 16, thereby giving a fine appearance to the mat and frame assembly but also facilitating sweeping dirt off the carpet into the pan 35 from all directions. Square shoulders 48 are defined on opposite sides of the mat 14 for flush abutment with the front ends of the two arms 32, whereby to fix the location of the mat 14 properly with respect to the toe-board TB so that the toe-board extension 15 will rest properly on the toe-board carpet. Upward displacement of the mat relative to the front end of the frame 16 is prevented by the engagement of rearwardly projecting lugs 49 on the mat 14 at shoulders 48 in the open front ends of the arms 32 on opposite sides of the frame 16, as indicated in dotted lines in FIG. 1 and better illustrated in FIGS. 11, 12, and 13.

In operation, it should be clear that so long as the mat 14 is in place in the locating frame 16, the driver can scrape off dirt and moisture from the bottom of his shoes into the pan 35, and any dirt on the carpet around the mat and frame assembly can be swept nicely into the pan 35 over the curved edges 17 of the frame and curved edges 47 of the mat. Whatever moisture is collected in the pan is allowed to evaporate, the top surfaces of the various ribs 36, 40, 41, and 45 meanwhile remaining fairly dry. Vacuum cleaning of the mat from time to time will keep it clear of dirt but if, for example, there are any unsightly smears of dirt that might not be otherwise so easily removed, the mat can be removed from the frame 16 for thoroughly washing it, the mat being stripped off the frame easily after lifting its toe-board extension 15 and unhooking the lugs 49 from the front end of the frame. In replacing the mat in the frame, one can first insert the lugs 49 in the front end of the frame and then lay the toe-board extension 15 on the toe-board TB, after which the rest of the mat can be dropped and pressed into place, or do it the reverse way, stepping on the front end of the mat to snap the lugs 49 into place. The wedging engagement of the tapered flanges 22 on the rim 21 of the mat 14 on the sloping sides 20 of the channels 19 of the frame 16 assures the mat being laid flat as the flanges 22 are pressed down firmly into place, and, with this wedging frictional engagement between the frame and the marginal edge portions of the mat there is every assurance of the mat not working loose and standing up here and there. It will always remain neatly flush with the frame all around.

Mat 14a shown in FIG. 4 is for the front passenger's position and is similar to the mat 14 shown in FIG. 1, except that the toe-board extension 15a extends the full width of the pan portion 35a, and all of the shoe scraper ribs 45a are of the same length as the shoe scraper ribs 36a in the pan 35a. The ribs 41a provided in a row across the front of the pan 35a are all of the same length as those at the left hand end of the front row of ribs 41 in FIG. 1. The bottom 37a of the pan 35a has the same channels 38a and 39a as are provided at 38 and 39 in pan 35, and there are the same ribs 34a in channels 39a as at 34 in channels 39, the ribs 34a, 36a, and 41a all having their top surfaces in substantially coplanar relationship, similarly as in mat 14 previously described. The toe-board extension 15a has a recess 44a draining into the pan portion 35a similarly as in the mat 14. Also, there are the same shoulders 48a provided on the front portion of the mat for locating abutment with the front end of the arms 32a of the frame 16a, the latter being a duplicate of the frame 16, fastened by three screws 24 similarly arranged as in the construction of FIG. 1, and similarly interlocked with the front end portion of the mat by entry of lugs 49a in the front ends of the arms 32a of the frame. This mat and frame combination is otherwise the same as that disclosed in FIG. 1, and, of course, the operation is substantially the same.

Referring next to FIG. 7 and 8, the floor mat 14b is designed for use in each of the two-rear seat locations and has a complete four-sided rectangular locating frame 16b in which the rim portion on all four sides of the pan 35b has the same wedging engagement as was described for the three sides of the mats 14 and 14a previously, the channel 19b extending all around the inside of the frame 16b and having the downwardly tapered flange 22b on the marginal portion of the mat wedgingly engaged therein against the sloping inner side wall 20b of the channel. In this construction the frame is fastened rigidly to the floor by four screws 24, one at the middle of each of the four sides of the frame. The pan 35b has only two sets of foot scraping ribs 34b and 36b of the same height as the ribs 34 and 36 of FIG. 1 and ribs 34a and 36a of FIG. 4, the pan 35b being of the same depth as pans 35 and 35a of FIGS. 1 and 4 with interconnecting channels 38b and 39b similarly arranged as the channels 38a and 39a of FIG. 4. Hence, substantially the same operation is obtainable with this combination of mat and frame as with the two others previously described. However, in the absence of the toe-board extension, which facilitates stripping the mat from the frame, a notch 50 is provided in the rear edge of the mat 14b at the middle in register with the gap 27 at the middle of the inner wall 20b of channel 19b, so that a screw driver or other similar tool can be entered between the mat and frame to pry the mat upwardly out of the frame enough to permit one to take hold of it and strip it the rest of the way out of the frame. The downwardly curved marginal portion of frame 16b will, of course, be impressed into the carpet on all four sides of the assembly similarly as in the frames 16 and 16a, as shown in FIGS. 3 and 5, respectively, and hence, it is easy to sweep dirt from the carpet into the pan 35b on all four sides of the assembly. The conical projections 34 provided on the bottom of the mats 14 and 14a are not required in the mat 14b due to the confinement of the mat by the frame 16b on all four sides.

It is believed the foregoing description conveys a good understanding of the objects and advantages of my invention. The appended claims have been drawn to cover all legitimate modifications and adaptations.

I claim:

1. In a floor mat construction for vehicles, a substantially horizontal floor overlaid with carpet of compressable material, a generally rectangular frame of relatively rigid material resting on the carpet and rigidly secured to the floor through said carpet so as to be impressed therein and thereby held against lateral displacement, said frame having downwardly inclined side portions impressed into the carpet so as to facilitate sweeping of dirt off the carpet around said frame over said frame, a floor mat of flexible material which includes a generally rectangular pan resting on the carpet inside and closely confined by said frame so as to fix the location of said mat on said floor, shoe scraper means provided in said pan, whereby dirt and moisture scraped from the bottom of shoes is retained in said pan for evaporation of the moisture while the top of said scraper means remains fairly dry, the top of said pan lying substantially flush with the top of said frame to facilitate sweeping dirt from the carpet around said frame over said frame into said pan, said mat being removable from and replaceable in said frame to facilitate thorough cleaning of said pan and scraper means, and vertically interfitting flanges and grooves provided on said floor mat and frame frictionally interconnecting these parts to maintain assembled relationship between said mat and frame and yet permit removal of said mat from said frame.

2. A floor mat construction as set forth in claim 1 wherein the floor mat has a marginal horizontal top wall disposed flush with the top of said frame and having a downwardly projecting tapering flange which wedgingly engages on the outer side of an inwardly inclined inner wall of a channel portion provided in said frame, whereby to frictionally connect the mat and frame.

3. A floor mat construction as set forth in claim 1 wherein the shoe scraper means provided in said pan is in the form of integral ribs in spaced relation to one another and to the sides of said pan, whereby moisture collected in said pan is substantially uniformly distributed to facilitate evaporation thereof.

4. A floor mat construction as set forth in claim 1 wherein said frame is generally U-shaped with the arms of the U substantially parallel and projecting forwardly from the cross portion of the U, the mat having shoulders defined on opposite sides of the pan portion thereof for locating abutment with the front ends of the arms of said U-shaped frame while said pan is closely confined on three sides by said frame.

5. A floor mat construction as set forth in claim 1 wherein said frame is generally U-shaped with the arms of the U substantially parallel and projecting forwardly from the cross portion of the U, the mat having shoulders defined on opposite sides of the pan portion thereof for locating abutment with the front ends of the arms of said U-shaped frame while said pan is closely confined on three sides by said frame, the mat including a generally rectangular toe-board extension on the front end thereof that is normally in coplanar relationship to the top of the rest of the mat but is flexible upwardly to overlie the carpet on the toe-board.

6. A floor mat construction as set forth in claim 1 wherein said frame is generally U-shaped with the arms of the U substantially parallel and projecting forwardly from the cross portion of the U, the mat having shoulders defined on opposite sides of the pan portion thereof for locating abutment with the front ends of the arms of said U-shaped frame while said pan is closely confined on three sides by said frame, the mat including a generally rectangular toe-board extension on the front end thereof that is normally in coplanar relationship to the top of the rest of the mat but is flexible upwardly to overlie the carpet on the toe-board, the toe-board extension having a generally rectangular recess provided therein communicating at the rear thereof with the front portion of said pan so as to drain into said pan.

7. A floor mat construction as set forth in claim 1 wherein said frame is generally U-shaped with the arms of the U substantially parallel and projecting forwardly from the cross portion of the U, the mat having shoulders defined on opposite sides of the pan portion thereof for locating abutment with the front ends of the arms of said U-shaped frame while said pan is closely confined on three sides by said frame, the mat including a generally rectangular toe-board extension on the front end thereof that is normally in coplanar relationship to the top of the rest of the mat but is flexible upwardly to overlie the carpet on the toe-board, the toe-board extension having a generally rectangular recess provided therein communicating at the rear thereof with the front portion of said pan so as to drain into said pan, and shoe scraper ribs integral with said toe-board extension in spaced relation to one another and to the sides of said recess whereby moisture scraped off shoes on said ribs can drain from said recess into said pan.

8. A floor mat construction as set forth in claim 1 wherein said frame is generally U-shaped with the arms of the U substantially parallel and projecting forwardly from the cross portion of the U, the mat having shoulders defined on opposite sides of the pan portion thereof for locating abutment with the front ends of the arms of said U-shaped frame while said pan is closely confined on three sides by said frame, the mat including a generally rectangular toe-board extension on the front end thereof that is normally in coplanar relationship to the top of the rest of the mat but is flexible upwardly to overlie the carpet on the toe-board, the toe-board extension having a generally rectangular recess provided therein communicating at the rear thereof with the front portion of said pan so as to drain into said pan, and shoe scraper ribs integral with toe-board extension in spaced relation to one another and to the side of said recess whereby moisture scraped off shoes on said ribs can drain from said recess into said pan, the toe-board extension being narrow in relation to the rest of the mat and extending forwardly from the left side thereof.

9. A floor mat construction as set forth in claim 1 wherein said frame is generally U-shaped with the arms of the U substantially parallel and projecting forwardly from the cross portion of the U, the mat having shoulders defined on opposite sides of the pan portion thereof for locating abutment with the front ends of the arms of said U-shaped frame while said pan is closely confined on three sides by said frame, and rearward projections on said shoulders which extend into recesses provided therefor in the front ends of said arms whereby to prevent displacement of said mat relative to said frame.

10. A floor mat construction as set forth in claim 1 wherein said frame is generally U-shaped with the arms of the U substantially parallel and projecting forwardly from the cross portion of the U, the mat having shoulders defined on opposite sides of the pan portion thereof for locating abutment with the front ends of the arms of said U-shaped frame while said pan is closely confined on three sides by said frame, and interfitting projections and recesses provided on said mat and frame at said shoulders to prevent displacement of said mat relative to said frame.

References Cited

UNITED STATES PATENTS

| | | |
|---|---|---|
| 1,428,006 | 9/1922 | Conway. |
| 2,258,238 | 10/1941 | Collins _____ 180—90.6 X |
| 2,807,826 | 10/1957 | De Vault _____ 16—7 |
| 2,897,963 | 8/1959 | Byers. |
| 3,100,522 | 8/1963 | McIntyre _____ 15—238 X |
| 3,114,272 | 12/1963 | Sawyer. |

FOREIGN PATENTS 370,231  4/1932  Great Britain.

BENJAMIN HERSH, *Primary Examiner.*

J. A. PEKAR, *Assistant Examiner.*